United States Patent
Aronchick

(10) Patent No.: US 10,102,731 B1
(45) Date of Patent: Oct. 16, 2018

(54) CAMERA SYSTEM THAT IDENTIFIES POTENTIAL DROWNING SITUATION, ACTIVATES AUDITORY AND VISUAL ALARM, LAUNCHES LIFE PRESERVER AND/OR PROTECTIVE NETTING, AND ALERTS HOMEOWNER AND/OR EMS

(71) Applicant: Chris Aronchick, Kirkland, WA (US)

(72) Inventor: Chris Aronchick, Kirkland, WA (US)

(73) Assignee: Chris Aronchick, Kirkland, WA (US)

( * ) Notice: Subject to any disclaimer, the term of this patent is extended or adjusted under 35 U.S.C. 154(b) by 0 days.

(21) Appl. No.: 15/089,895

(22) Filed: Apr. 4, 2016

Related U.S. Application Data

(60) Provisional application No. 62/141,975, filed on Apr. 2, 2015.

(51) Int. Cl.
  *G08B 23/00* (2006.01)
  *G08B 21/08* (2006.01)
  *G06K 9/00* (2006.01)

(52) U.S. Cl.
  CPC ....... *G08B 21/086* (2013.01); *G06K 9/00771* (2013.01)

(58) Field of Classification Search
  CPC .................. G08B 21/086; G06K 9/00771
  See application file for complete search history.

(56) References Cited

U.S. PATENT DOCUMENTS

| | | | | |
|---|---|---|---|---|
| 5,408,222 A * | 4/1995 | Yaffe | .................... | G08B 21/088 340/539.1 |
| 5,638,048 A * | 6/1997 | Curry | ..................... | G01S 13/56 340/522 |
| 5,886,630 A * | 3/1999 | Menoud | ............... | G08B 21/082 340/540 |
| 5,953,439 A * | 9/1999 | Ishihara | .................. | G06T 7/254 382/107 |
| 6,133,838 A * | 10/2000 | Meniere | ............... | G08B 21/082 340/566 |
| 6,157,304 A * | 12/2000 | Bennett | ................ | G08B 21/082 340/522 |
| 7,330,123 B1 * | 2/2008 | Grahn | .................. | G08B 21/082 340/553 |
| 8,669,876 B2 * | 3/2014 | Anderson | ............ | G08B 21/086 340/541 |
| 9,666,054 B2 * | 5/2017 | Matko | .................. | G08B 21/086 |
| 2007/0273765 A1 * | 11/2007 | Wang | .................. | G06K 9/00771 348/152 |
| 2008/0048870 A1 * | 2/2008 | Laitta | ............... | G08B 13/19652 340/573.6 |
| 2009/0303055 A1 * | 12/2009 | Anderson | ............ | G08B 21/086 340/573.6 |
| 2010/0002222 A1 * | 1/2010 | Lubard | .................. | G01S 7/4802 356/4.01 |
| 2016/0012700 A1 * | 1/2016 | Matko | .................. | G08B 21/086 340/573.6 |
| 2016/0037138 A1 * | 2/2016 | Udler | .................... | H04N 5/2251 348/143 |

* cited by examiner

*Primary Examiner* — Quang D Pham
(74) *Attorney, Agent, or Firm* — FSP LLC

(57) ABSTRACT

Multiple drowning alert methods monitor a three-dimensional space to determine if a person is drowning or an unattended child is present within the three-dimensional space and initiate alarms, notifications, and safety devices.

16 Claims, 7 Drawing Sheets

CAMERA SYSTEM THAT IDENTIFIES POTENTIAL DROWNING SITUATION, ACTIVATES AUDITORY AND VISUAL ALARM, LAUNCHES LIFE PRESERVER AND/OR PROTECTIVE NETTING, AND ALERTS HOMEOWNER AND/OR EMS

CROSS-REFERENCE TO RELATED APPLICATIONS

This application claims priority and benefit under 35 U.S.C. 119 to U.S. application Ser. No. 62/141,975, filed on Apr. 2, 2015 and incorporated herein by reference in its entirety.

BACKGROUND

There are approximately ten drowning deaths per day in the United States, most of which are children in swimming pools. Many of these deaths might be prevented by a system utilizing body position, such as the body position characteristics of the Instinctive Drowning Response, to identify potential drowning situations with a high degree of precision and provide safety measures and alerts.

BRIEF SUMMARY

A camera system may use multiple camera types, including IR and video, to identify movement. Machine controls may then determine if there is a potential risk scenario. If a potential risk scenario is identified, the camera system may deploy a preventative measure while simultaneously activating an audible alarm, a visual alarm, and notifying a predetermined contact, usually the owner of the pool via either wireless or cellular network. If the owner does not respond within a specified time frame, usually 30 seconds, EMS may then be notified.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
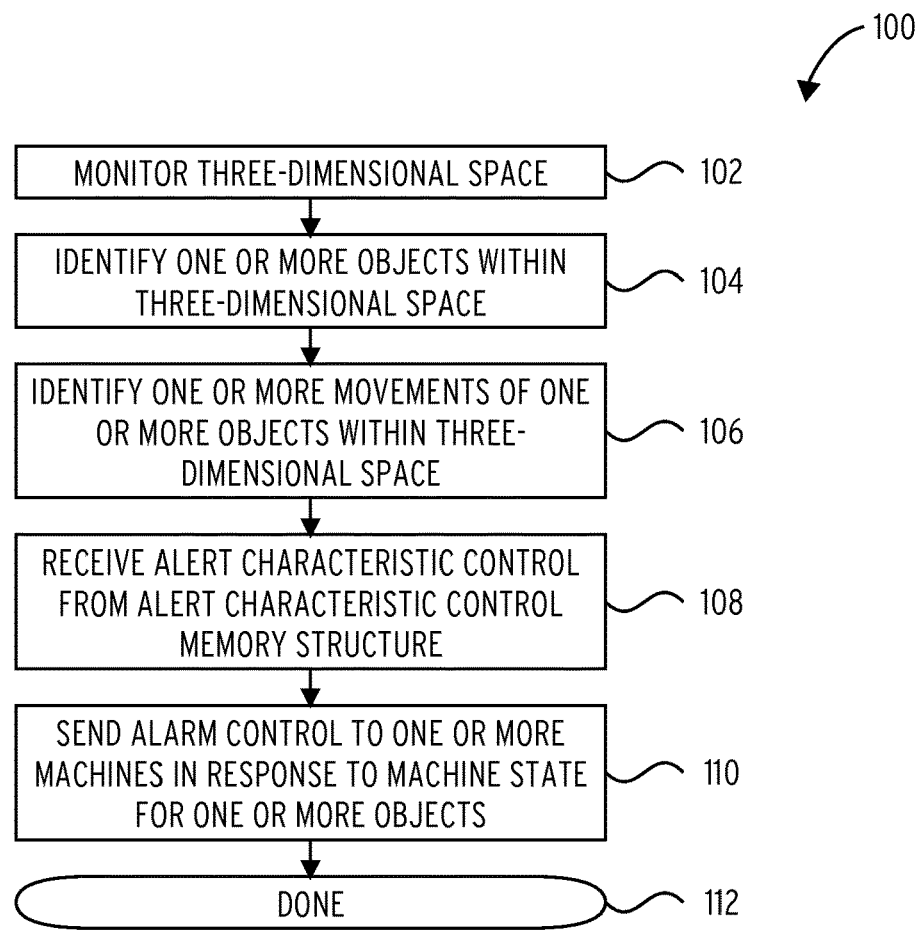
FIG. 1 illustrates an embodiment of a drowning alert method 100.
Figure 2:
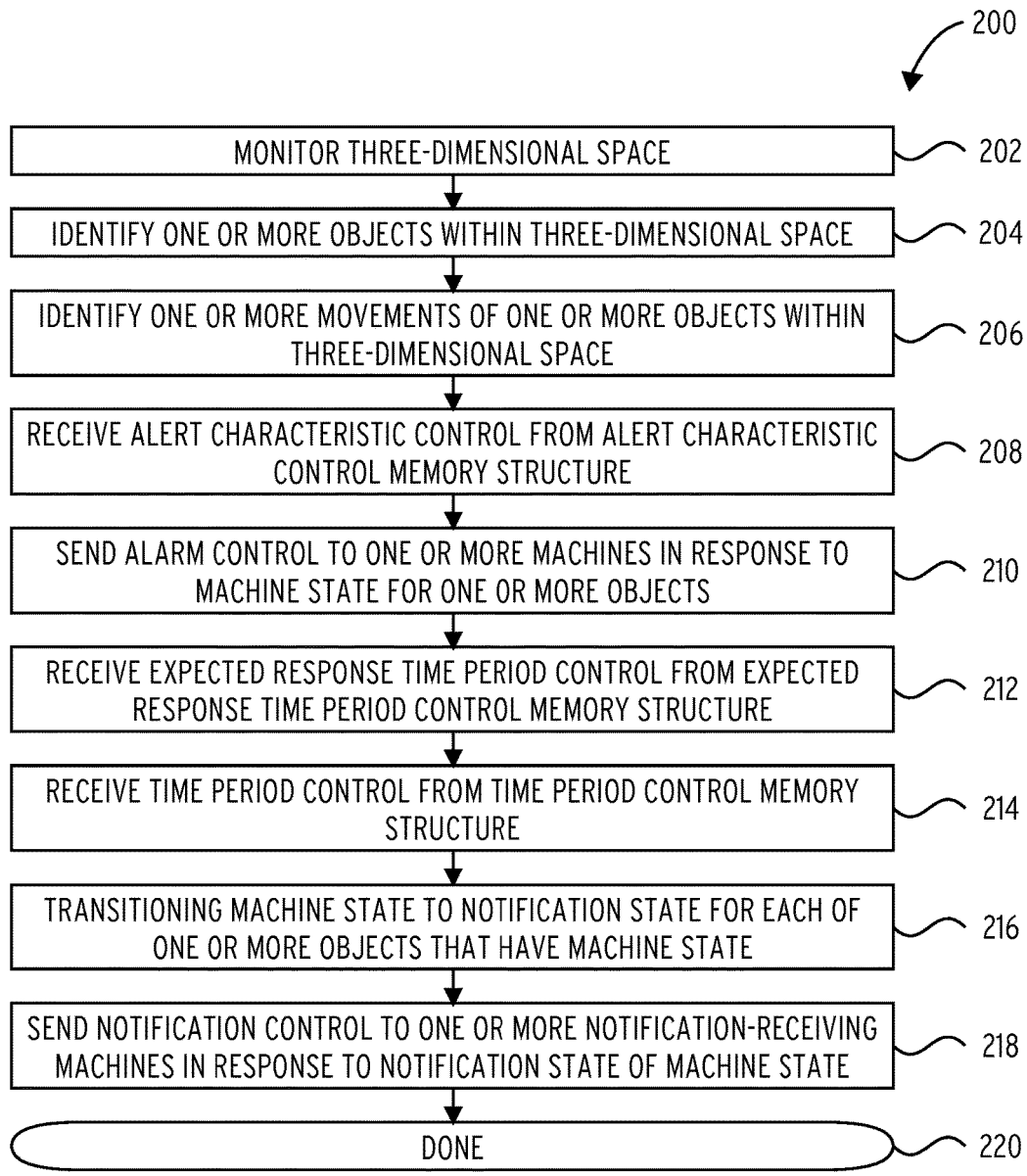
FIG. 2 illustrates an embodiment of a drowning alert method 200.
Figure 3:
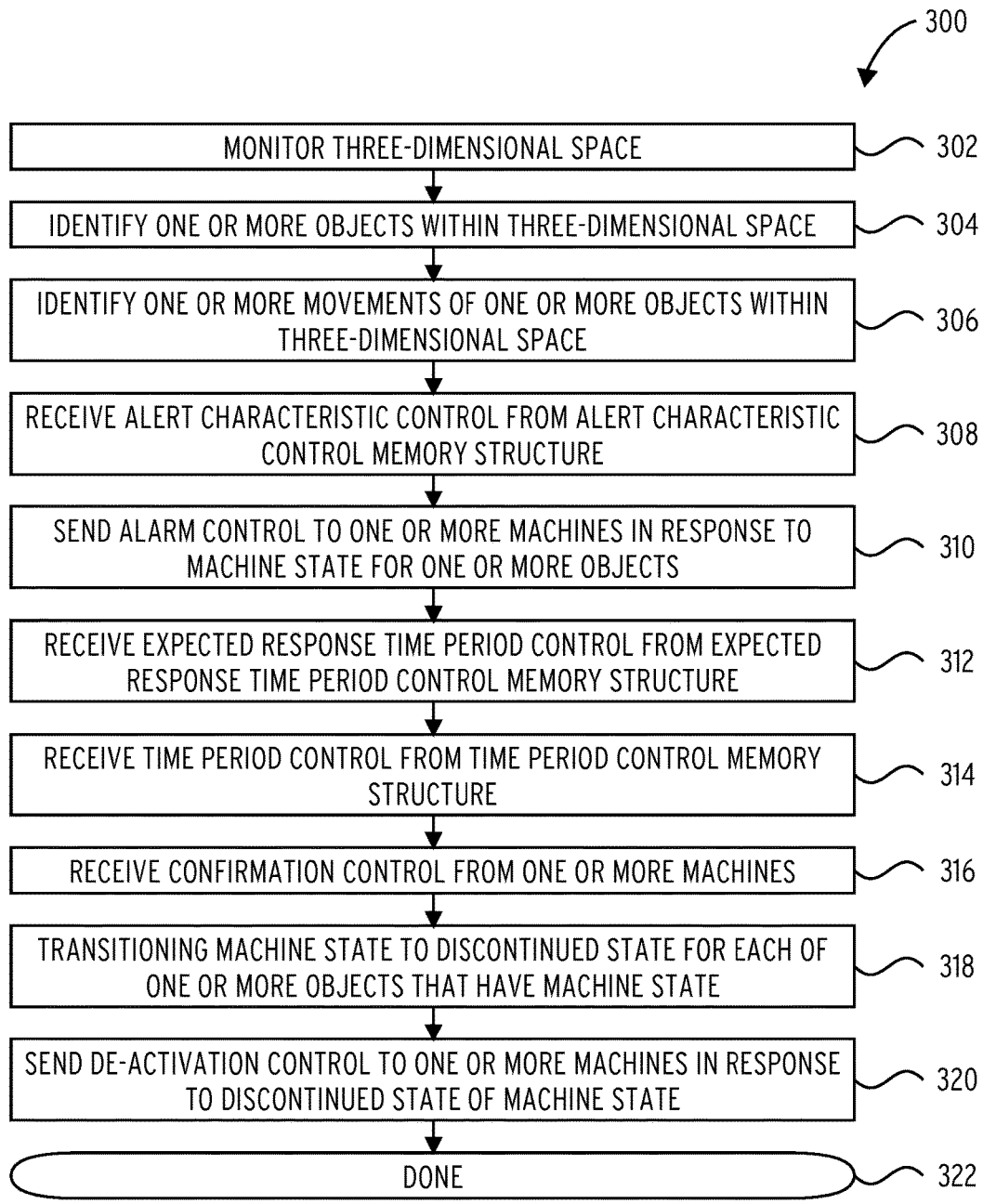
FIG. 3 illustrates an embodiment of a drowning alert method 300.
Figure 4:
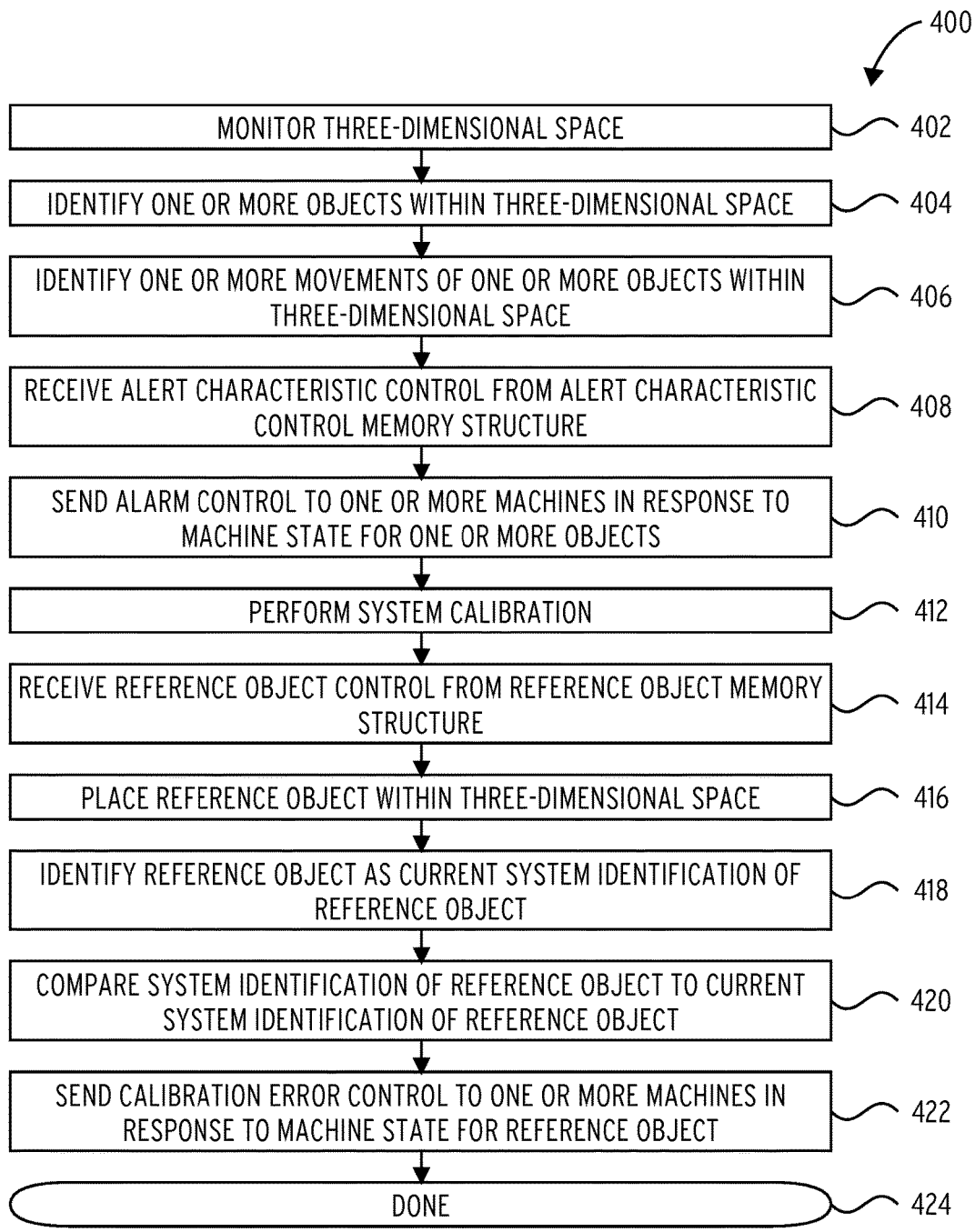
FIG. 4 illustrates an embodiment of a drowning alert method 400.
Figure 5:
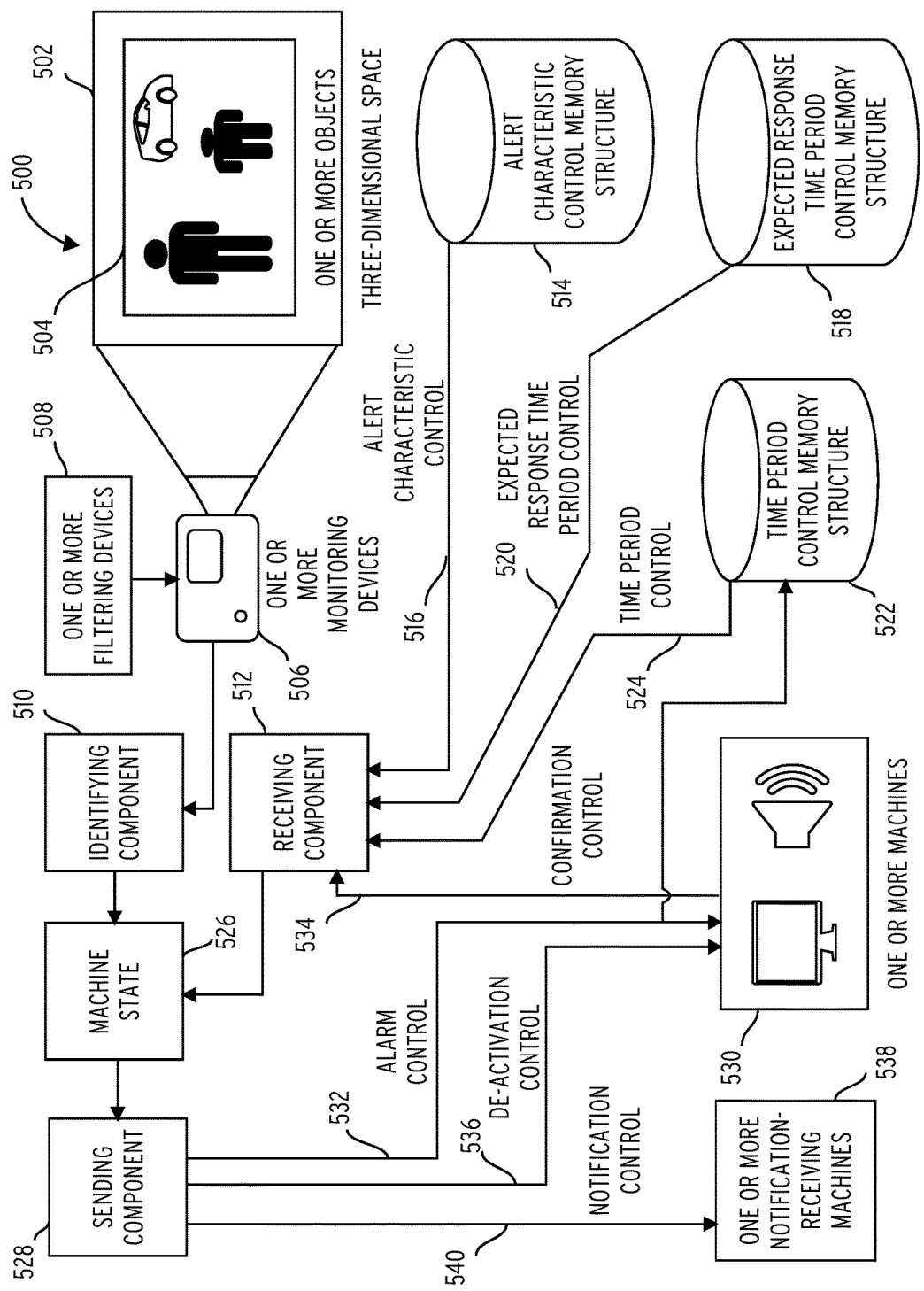
FIG. 5 illustrates an embodiment of drowning alert method system 500.
Figure 6:
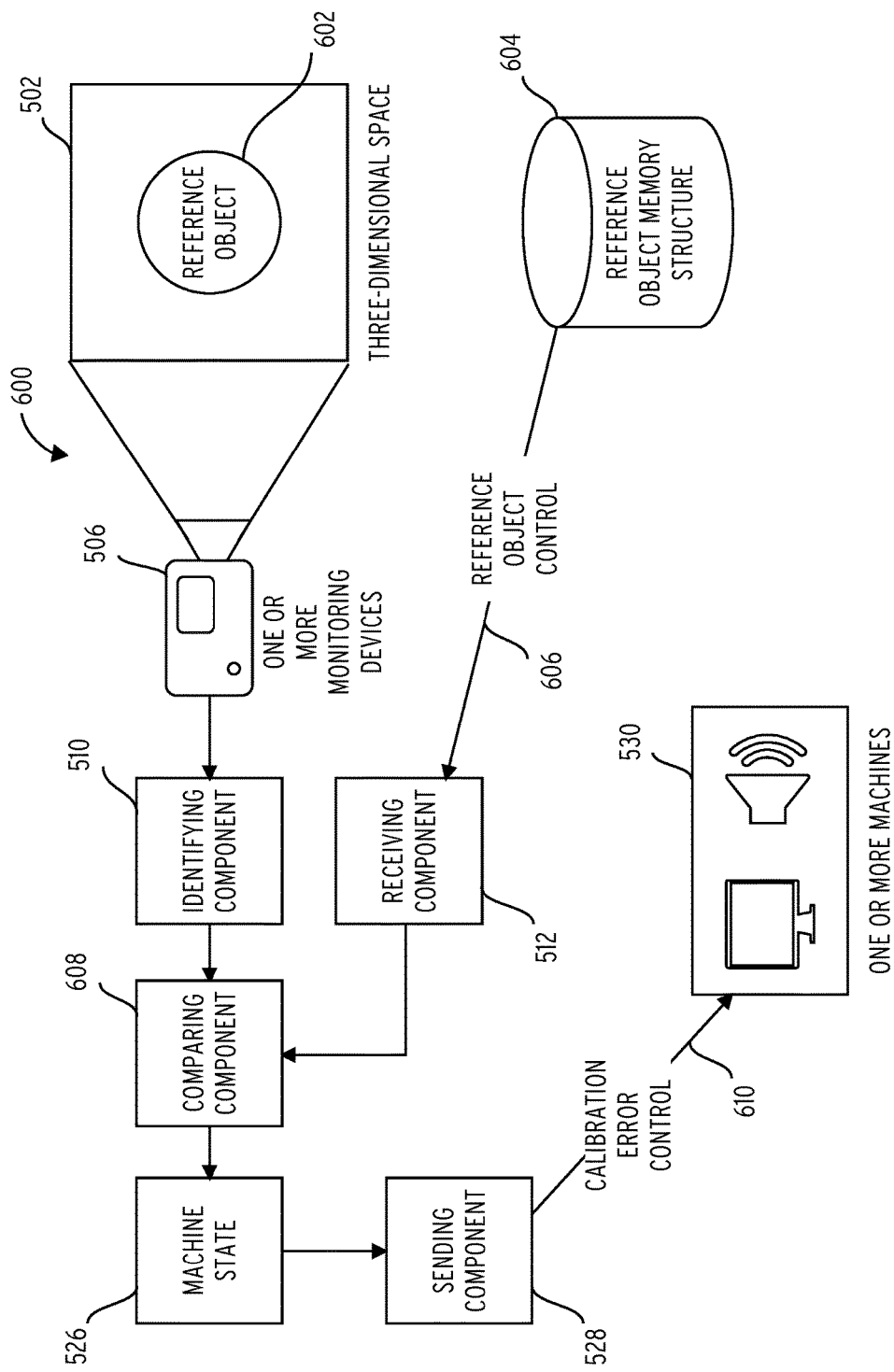
FIG. 6 illustrates an embodiment of drowning alert method system 600.

A drowning alert method may include monitoring a three-dimensional space, the monitoring performed by one or more monitoring devices; identifying one or more objects within the three-dimensional space; identifying one or more movements of the one or more objects within the three-dimensional space; receiving an alert characteristic control from an alert characteristic control memory structure; and/or sending an alarm control to one or more machines in response to a machine state for the one or more objects.

The alert characteristic control may include one or more alert characteristics. The alarm control may include instructions to alter the operation of the machines. The machine state for the objects may be set on condition that the movements include the alert characteristics.

The machines may include an email-receiving device, and the alarm control may include an email. For example, the machines may include an SMS-receiving device, and the alarm control may include an SMS.

The drowning alert method may further include receiving an expected response time period control from an expected response time period control memory structure, receiving a time period control from a time period control memory structure, transitioning the machine state to a notification state for each of objects that have the machine state, and/or sending a notification control to notification-receiving machines in response to the notification state of the machine state. The expected response time period control may include an expected response time period. The time period control may be a measurement of time, e.g., the time from the alarm control. The notification state may include the measurement of time, and may be greater than or equal to the expected response time period.

The notification control may include instructions to activate the notification-receiving machines. These machines may include an emergency medical service provider notification receiving device.

The method may further include receiving an expected response time period control from an expected response time period control memory structure, receiving a time period control from a time period control memory structure, receiving a confirmation control from the machines, transitioning the machine state to a discontinued state for each of the objects that have the machine state, and/or sending a de-activation control to the machines in response to the discontinued state of the machine state.

The time period control may include a measurement of time, e.g., the time from the alarm control. The measurement of time may be sent to the time period control.

The discontinued state may include the measurement of time, and may be activated when the time measurement is less than the expected response time period and upon receiving the confirmation control from one of the machines. The de-activation control may include instructions to de-activate the machines.

The objects may include a human, and the alert characteristics may include an instinctive drowning response. The movements may include the instinctive drowning response, and the machines may include a visual-signaling device producing a visual signal in response to receiving the alarm control. The machines may also or alternatively include an auditory signaling device producing an audible signal in response to receiving the alarm control. The machines may include a life preserver-deploying device that deploys a life preserver in response to receiving the alarm control.

The three-dimensional space may include a swimming pool, and the objects may include a small-statured human, the small-statured human not located within the swimming pool (but instead, for example, in a land area around the pool). The objects may not include (specifically exclude the presence of) a large-statured human (small and large being relatively configured dimensions), and alert characteristics may include identifying a small-statured human and not identifying a large-statured human. The machines may include a safety net-deploying device, the safety net-deploying device deploying a safety net in response to receiving the alarm control.

The alert characteristics may include an instinctive drowning response, e.g., no audible noise from the human, the human's mouth rising above and sinking below a surface of the swimming pool, the arms pressing against the surface of the swimming pool, the legs not engaged in a kicking motion, and/or no other movements by the human, particularly if the human is face down.

The monitoring devices may include a light-sensing camera, an infrared-sensing camera, and filtering device(s).

The drowning alert method may further include performing a system calibration, including receiving a reference object control from a reference object memory structure, placing the reference object within the three-dimensional space, identifying the reference object as a current system identification of the reference object, comparing the system identification of the reference object to the current system identification of the reference object, and/or sending a calibration error control to the machines in response to the machine state for the reference object. The reference object control may include a system identification of the reference object. The calibration error control may include instructions to alter the operation of the machines, where the machine state for the reference object is set on condition that the current system identification of the reference object is not approximately the system identification of the reference object.

DRAWINGS

In block 102, drowning alert method 100 monitors a three-dimensional space. In block 104, drowning alert method 100 identifies one or more objects within the three-dimensional space. In block 106, drowning alert method 100 identifies one or more movements of the one or more objects within the three-dimensional space. In block 108, drowning alert method 100 receives an alert characteristic control from an alert characteristic control memory structure. In block 110, drowning alert method 100 sends an alarm control to one or more machines in response to a machine state for the one or more objects. In done block 112, drowning alert method 100 ends.

Drowning alert method 100 receives multiple controls from machines, generating a machine state. In response to one or more particular machine states, the drowning alert method 100 transforms those controls to machine controls, which are then sent to and used to alter one or more machines.

In block 202, drowning alert method 200 monitors a three-dimensional space. In block 204, drowning alert method 200 identifies one or more objects within the three-dimensional space. In block 206, drowning alert method 200 identifies one or more movements of the one or more objects within the three-dimensional space. In block 208, drowning alert method 200 receives an alert characteristic control from an alert characteristic control memory structure. In block 210, drowning alert method 200 sends an alarm control to one or more machines in response to a machine state for the one or more objects. In block 212, drowning alert method 200 receives an expected response time period control from an expected response time period control memory structure. In block 214, drowning alert method 200 receives a time period control from a time period control memory structure. In block 216, drowning alert method 200 transitioning the machine state to a notification state for each of the one or more objects that have the machine state. In block 218, drowning alert method 200 sends a notification control to one or more notification-receiving machines in response to the notification state of the machine state. In done block 220, drowning alert method 200 ends.

Drowning alert method 200 receives multiple controls from machines, generating a machine state. In response to one or more particular machine states, the drowning alert method 200 transforms those controls to machine controls, which are then sent to and used to alter one or more machines.

In block 302, drowning alert method 300 monitors a three-dimensional space. In block 304, drowning alert method 300 identifies one or more objects within the three-dimensional space. In block 306, drowning alert method 300 identifies one or more movements of the one or more objects within the three-dimensional space. In block 308, drowning alert method 300 receives an alert characteristic control from an alert characteristic control memory structure. In block 310, drowning alert method 300 sends an alarm control to one or more machines in response to a machine state for the one or more objects. In block 312, drowning alert method 300 receives an expected response time period control from an expected response time period control memory structure. In block 314, drowning alert method 300 receives a time period control from a time period control memory structure. In block 316, drowning alert method 300 receives a confirmation control from the one or more machines. In block 318, drowning alert method 300 transitioning the machine state to a discontinued state for each of the one or more objects that have the machine state. In block 320, drowning alert method 300 sends a de-activation control to the one or more machines in response to the discontinued state of the machine state. In done block 322, drowning alert method 300 ends.

Drowning alert method 300 receives multiple controls from machines, generating a machine state. In response to one or more particular machine states, the drowning alert method 300 transforms those controls to machine controls, which are then sent to and used to alter one or more machines.

In block 402, drowning alert method 400 monitors a three-dimensional space. In block 404, drowning alert method 400 identifies one or more objects within the three-dimensional space. In block 406, drowning alert method 400 identifies one or more movements of the one or more objects within the three-dimensional space. In block 408, drowning alert method 400 receives an alert characteristic control from an alert characteristic control memory structure. In block 410, drowning alert method 400 sends an alarm control to one or more machines in response to a machine state for the one or more objects. In block 412, drowning alert method 400 performs a system calibration. In block 414, drowning alert method 400 receives a reference object control from a reference object memory structure. In block 416, drowning alert method 400 places the reference object within the three-dimensional space. In block 418, drowning alert method 400 identifies the reference object as a current system identification of the reference object. In block 420, drowning alert method 400 compares the system identification of the reference object to the current system identification of the reference object. In block 422, drowning alert method 400 sends a calibration error control to the one or more machines in response to the machine state for the reference object. In done block 424, drowning alert method 400 ends.

Drowning alert method 400 receives multiple controls from machines, generating a machine state. In response to one or more particular machine states, the drowning alert method 400 transforms those controls to machine controls, which are then sent to and used to alter one or more machines.

The drowning alert method system 500 may comprise three-dimensional space 502, one or more objects 504, one or more monitoring devices 506, one or more filtering devices 508, identifying component 510, receiving component 512, alert characteristic control memory structure 514, alert characteristic control 516, expected response time period control memory structure 518, expected response time period control 520, time period control memory structure 522, time period control 524, machine state 526, sending component 528, one or more machines 530, alarm control 532, confirmation control 534, de-activation control 536, one or more notification-receiving machines 538, and notification control 540.

Drowning alert method system 500 may be operated in accordance with FIG. 1, FIG. 2, FIG. 3, or FIG. 4.

Three-dimensional space 502 may contain one or more objects 504 and may be defined by the space monitored by one or more monitoring devices 506. Three-dimensional space 502 may contain various landscape features. In some embodiments, three-dimensional space 502 may contain liquid regions or sufficient volume and depth to immerse a human, such as a swimming pool or variations thereof.

One or more objects 504 may include any object in three-dimensional space 502. One or more objects 504 may comprise a human or humans, including both large-statured humans and small-statured humans, and non-human objects, such as a reference object.

One or more monitoring devices 506 may monitor a three-dimensional space 502. In some embodiments, each of the one or more monitoring devices 506 define a separate three-dimensional space 502. In other embodiments, one or more monitoring devices 506 may have a three-dimensional space 502 that overlaps with the three-dimensional space 502 defined by another of one or more monitoring devices 506. One or more monitoring devices 506 may comprise a camera configured to receive light. Other embodiments of one or more monitoring devices 506 may be configured to receive infrared radiation. In other embodiments, one or more monitoring devices 506 may receive sound from the three-dimensional space 502. In yet other embodiments, one or more monitoring devices 506 may detect other electromagnetic radiation or vibrations in either a fluid or solid medium. In some embodiments, one or more monitoring devices 506 may also comprise one or more filtering devices 508.

One or more filtering devices 508 may be provided for one or more monitoring devices 506. In some embodiments, one or more filtering devices 508 may be internal to one or more monitoring devices 506. In other embodiments, one or more filtering devices 508 may be external to one or more monitoring devices 506. One or more filtering devices 508 may be integrated or mounted to one or more monitoring devices 506. One or more filtering devices 508 may alter aspects of the light, infrared, sound, or other monitored radiation or vibration received by one or more monitoring devices 506 from three-dimensional space 502.

Identifying component 510 may receive an image from one or more monitoring devices 506 based on the light, infrared, sound, or other electromagnetic radiation or vibration received from three-dimensional space 502. In some embodiments, identifying component 510 may identify the one or more objects 504 in three-dimensional space 502. In some embodiments, identifying component 510 may identify a human, both a large-statured human and a small-statured human, or a non-human object, such as a reference object. In some embodiments, identifying component 510 may identify one or more movements of the one or more objects 504. In yet further embodiments, identifying component 510 may identify one or more movements of a human that comprise an instinctive drowning response, which may comprise no audible noise from the human; the mouth of the human rising above and sinking below a surface of the swimming pool; the one or more arms of the human pressing against the surface of the swimming pool; the one or more legs of the human not engaged in a kicking motion; and no other movements by the human. In other embodiments, identifying component 510 may identify the presence or absence a small-statured human in three-dimensional space 502 and identify the presence or absence of a large-statured human in three-dimensional space 502. In some embodiments, identifying component 510 may send controls to affect machine state 526.

Receiving component 512 may receive an alert characteristic control 516 from alert characteristic control memory structure 514. In some embodiments, receiving component 512 may receive an expected response time period control 520 from expected response time period control memory structure 518. In some embodiments, receiving component 512 may receive time period control 524 from time period control memory structure 522. In some embodiments, receiving component 512 may receive confirmation control 534 from one or more machines 530. In some embodiments, receiving component 512 may sent controls to alter machine state 526.

Alert characteristic control memory structure 514 may store information including controls, such as alert characteristic control 516, that may be sent to and received by receiving component 512. In some embodiments, alert characteristic control memory structure 514 may be configurable by a user or by machine controls. In some embodiments, alert characteristic control memory structure 514 may continuously send information via alert characteristic control 516 to receiving component 512. In other embodiments, alert characteristic control memory structure 514 may send information intermittently via alert characteristic control 516 to receiving component 512. In yet further embodiments, alert characteristic control memory structure 514 may send information via alert characteristic control 516 to receiving component 512 upon user request. Alert characteristic control memory structure 514 may be a machine or cloud-based structure.

Alert characteristic control 516 may comprise one or more alert characteristics. Alert characteristic control 516 may be sent from alert characteristic control memory structure 514 to receiving component 512. In some embodiments, the one or more alert characteristics comprise the instinctive drowning response, which may comprise no audible noise from the human; the mouth of the human rising above and sinking below a surface of the swimming pool; the one or more arms of the human pressing against the surface of the swimming pool; the one or more legs of the human not engaged in a kicking motion; and no other movements by the human. In other embodiments, the one or more alert characteristics may comprise identifying a small-statured human and not identifying a large-statured human. In some embodiments, alert characteristic control 516 may be modified via alert characteristic control memory structure 514 to include other one or more alert characteristics. In other embodiments, alert characteristic control 516 may be modified by a user via alert characteristic control memory structure 514 to allow specific humans or objects to trigger a separate machine state of machine state 526 when received by receiving component 512 and sent to machine state 526.

Expected response time period control memory structure 518 may store information including controls, such as expected response time period control 520, that may be sent to and received by receiving component 512. In some embodiments, expected response time period control memory structure 518 may be configurable by a user or by machine controls. In some embodiments, expected response time period control memory structure 518 may continuously send information via expected response time period control 520 to receiving component 512. In other embodiments, expected response time period control memory structure 518 may send information intermittently via expected response time period control 520 to receiving component 512. In yet further embodiments, expected response time period control memory structure 518 may send information via expected response time period control 520 to receiving component 512 upon user request. Expected response time period control memory structure 518 may be a machine or cloud-based structure.

Expected response time period control 520 may comprise an expected response time period. Expected response time period control 520 may be sent from expected response time period control memory structure 518 to receiving component 512. In some embodiments, expected response time period may be a measurement of time. In some embodiments, expected response time period may be based on the time that a human may go from the instinctive drowning response to a submerged state. In some embodiments, expected response time period may be thirty (30) seconds. Expected response time period control 520, and expected response time period, may be modified via alert expected response time period control memory structure 518 to set an alternate expected response time period. In some embodiments, a unique expected response time period may be set for specific humans.

Time period control memory structure 522 may store information including controls, such as time period control 524, that may be sent to and received by receiving component 512. In some embodiments, time period control memory structure 522 may receive alarm control 532. In some embodiments, time period control memory structure 522 may be configurable by a user or by machine controls. In some embodiments, time period control memory structure 522 may continuously send information via time period control 524 to receiving component 512. In other embodiments, time period control memory structure 522 may send information intermittently via time period control 524 to receiving component 512. In yet further embodiments, time period control memory structure 522 may send information via time period control 524 to receiving component 512 upon user request. Time period control memory structure 522 may be a machine or cloud-based structure.

Time period control 524 may comprise a measurement of time. Time period control 524 may be sent from time period control memory structure 522 to receiving component 512. In some embodiments, the measurement of time may comprise the time from time period control memory structure 522 receiving an alarm control 532 to the time at which time period control 524 may be sent from time period control memory structure 522 to receiving component 512.

Machine state 526 may receive information from identifying component 510 and receiving component 512 in various states as described above. Machine state 526 may be altered as a result of processing this information. In some embodiments, machine state 526 may be altered to an alarm state by receiving identification of a human that comprises the one or more objects 504 with one or more movements that comprise the instinctive drowning response from identifying component 510 and receiving one or more alert characteristics comprising the instinctive drowning response from alert characteristic control memory structure 514 via alert characteristic control 516 and receiving component 512. In some embodiments, machine state 526 may be altered to an alarm state by receiving identification of a small-statured human and not receiving identification of a large-statured human from identifying component 510 and and receiving one or more alert characteristics comprising identification of a small-statured human and not receiving identification of a large-statured human from alert characteristic control memory structure 514 via alert characteristic control 516 and receiving component 512. In some embodiments, machine state 526 may be altered to a notification state by receiving via receiving component 512 a time period control 524 comprising a measurement of time from time period control memory structure 522 greater than the expected response time period received from expected response time period control memory structure 518 via expected response time period control 520. In other embodiments, machine state 526 may be altered to a discontinued state by receiving via receiving component 512 a time period control 524 comprising a measurement of time from time period control memory structure 522 less than the expected response time period received from expected response time period control memory structure 518 via expected response time period control 520 and receiving a confirmation control 534 from one or more machines 530 via receiving component 512. Additional alarm states, notification states, and discontinued states may be provided. Machine state 526 may send further controls to sending component 528 to send further controls to additional components based on the machine state.

Sending component 528 may receive controls based on the machine state of machine state 526. Sending component 528 may send controls based on the control received from machine state 526 to one or more machines 530, time period control memory structure 522, or one or more notification-receiving machines 538. In some embodiments, sending component 528 sends alarm control 532 to one or more machines 530 upon receiving an alarm state from machine state 526. In some embodiments, sending component 528 sends alarm control 532 to time period control memory structure 522 upon receiving an alarm state from machine state 526. In some embodiments, sending component 528 sends de-activation control 536 to one or more machines 530 upon receiving a discontinued state from machine state 526. In some embodiments, sending component 528 sends notification control 540 to one or more notification-receiving machines 538 upon receiving a notification state from machine state 526.

One or more machines 530 may receive alarm control 532 from sending component 528. One or more machines 530 may have its operation altered in response to receiving alarm control 532. In some embodiments, one or more machines 530 may comprise an email-receiving device configured to receive an email. In other embodiments, one or more machines 530 may comprise an SMS-receiving device configured to receive an SMS. In further embodiments, one or more machines 530 may comprise a visual-signaling device configured to emit a visual signal. In yet further embodiments, one or more machines 530 may comprise an auditory signaling device configured to emit an audible signal. In still further embodiments, one or more machines 530 may comprise a life preserver-deploying device configured to deploy a life preserver. In other embodiments, one or more machines 530 may comprise a safety net-deploying device configure to deploy a safety net. One or more machines 530 may further receive a de-activation control 536 from sending component 528. One or more machines 530 reverting from its altered state in response to the alarm control 532 upon receiving de-activation control 536.

Alarm control 532 may be sent from sending component 528 to one or more machines 530. Alarm control 532 may comprise instructions for one or more machines 530 to alter its operation when received. In some embodiments, alarm control 532 is an email. In other embodiments, alarm control 532 is an SMS. Alarm control 532 may also be sent to time period control memory structure 522 from sending component 528. Alarm control 532 may alter time period control memory structure 522 such that the measurement of time contained within time period control 524 is based on the time upon which alarm control 532 is received by time period control memory structure 522.

Confirmation control 534 may be sent from one or more machines 530 to receiving component 512. In some embodiments, confirmation control 534 is an email. In other embodiments, confirmation control 534 is an SMS. Upon receipt by receiving component 512, confirmation control 534 may alter controls sent by receiving component 512 to machine state 526, which may further alter the machine state of machine state 526.

De-activation control 536 may be sent from sending component 528 to one or more machines 530. De-activation control 536 may comprise instructions for one or more machines 530 to alter its operation when received.

One or more notification-receiving machines 538 may receive a notification control 540 from sending component 528. In some embodiments, one or more notification-receiving machines 538 may comprise an emergency medical service provider notification receiving device.

Notification control 540 may be sent from sending component 528 to one or more notification-receiving machines 538. Notification control 540 may comprise instructions for one or more notification-receiving machines 538 to alter its operation. In some embodiments, notification control 540 comprises a location. In other embodiments, notification control 540 comprises an image captured by identifying component 510 via one or more filtering devices 508.

The drowning alert method system 600 may comprise three-dimensional space 502, one or more monitoring devices 506, identifying component 510, receiving component 512, machine state 526, sending component 528, and one or more machines 530, as well as, reference object 602, reference object memory structure 604, reference object control 606, comparing component 608, and calibration error control 610.

Drowning alert method system 600 may be operated in accordance with FIG. 1, FIG. 2, FIG. 3, or FIG. 4.

Reference object 602 may be located within three-dimensional space 502 and monitored by one or more monitoring devices 506.

Reference object memory structure 604 may store information including controls, such as reference object control 606, that may be sent to and received by receiving component 512. In some embodiments, reference object memory structure 604 may be configurable by a user or by machine controls. In some embodiments, reference object memory structure 604 may continuously send information via reference object control 606 to receiving component 512. In other embodiments, reference object memory structure 604 may send information intermittently via reference object control 606 to receiving component 512. In yet further embodiments, reference object memory structure 604 may send information via reference object control 606 to receiving component 512 upon user request. Reference object memory structure 604 may be a machine or cloud-based structure.

Reference object control 606 may be sent from reference object memory structure 604 to receiving component 512. Reference object control 606 may comprise a system identification of reference object 602.

Comparing component 608 may receive a control from identifying component 510 that identifies reference object 602 and may receive a control from receiving component 512 that includes a system identification of reference object 602 from reference object memory structure 604 via reference object control 606. Comparing component 608 may compare the identification from identifying component 510 and the system identification from receiving component 512. Comparing component 608 may send a control to machine state 526 to alter the machine state of machine state 526 to a calibration error state. In some embodiments, the calibration error state may comprise reference object 602 being ninety percent similar to the system identification of reference object 602. In other embodiments, the percent similarity may be altered via reference object memory structure 604.

Calibration error control 610 may be sent from sending component 528 to one or more machines 530 in response to a machine state of machine state 526 corresponding to a calibration error state. Calibration error control 610 may comprise instruction to alter the operation of one or more machines 530. In some embodiments, calibration error control 610 may provide instructions to for one or more machines 530 to emit an audible signal. In other embodiments, calibration error control 610 may provide instructions to for one or more machines 530 to emit a visual signal.

Figure 7:
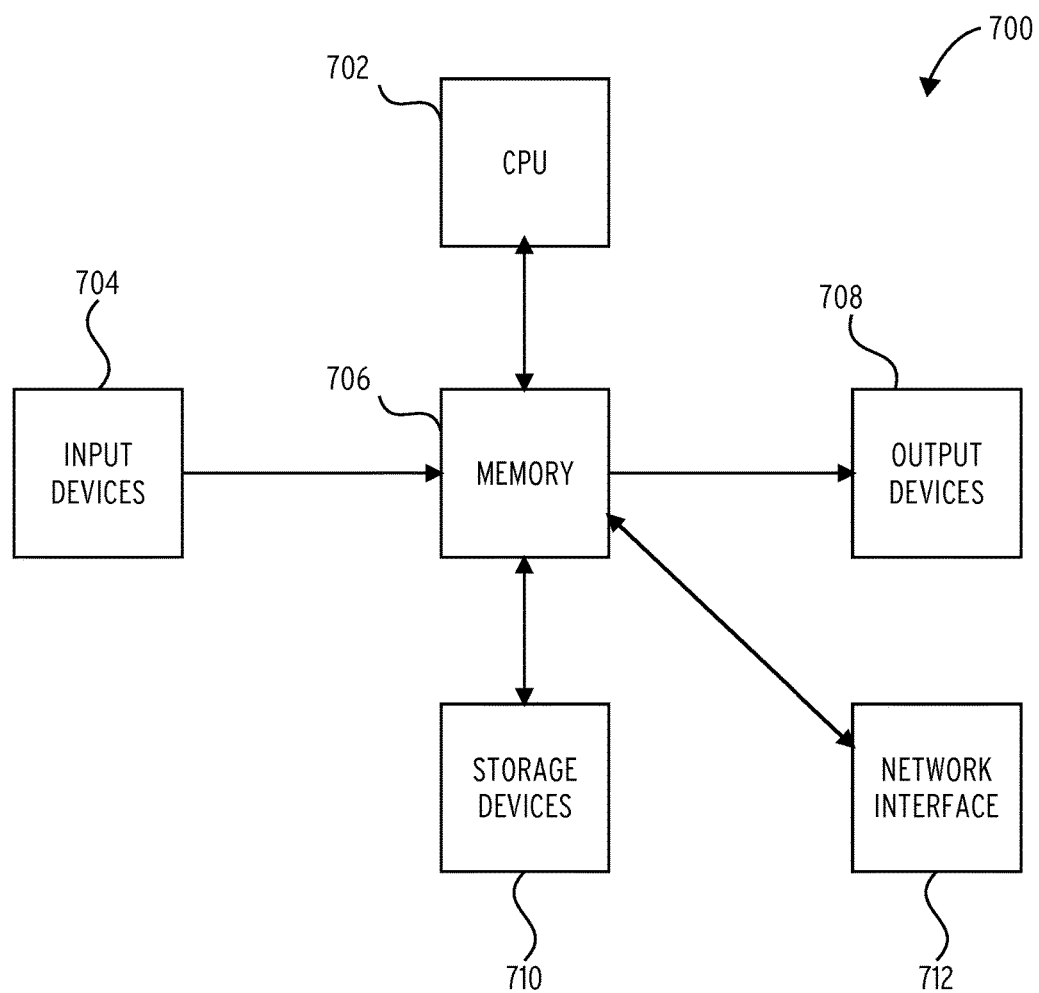
FIG. 7 illustrates an embodiment of a digital apparatus 700 to implement components and process steps of the system described herein.

FIG. 7 illustrates an embodiment of a digital apparatus 700 to implement components and process steps of the system described herein.

Input devices 704 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 704 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 704 are provided via various machine signal conductors (e.g., busses or network interfaces) and circuits to memory 706.

The memory 706 is typically what is known as a first or second level memory device, providing for storage (via configuration of matter or states of matter) of signals received from the input devices 704, instructions and information for controlling operation of the CPU 702, and signals from storage devices 710.

Information stored in the memory 706 is typically directly accessible to the CPU 702 of the device. Signals input to the device cause the reconfiguration of the internal material/ energy state of the memory 706, creating in essence a new machine configuration, influencing the behavior of the digital apparatus 700 by affecting the behavior of the CPU 702 with control signals (instructions) and data provided in conjunction with the control signals.

Second or third level storage devices 710 may provide a slower but higher capacity machine memory capability. Examples of storage devices 710 are hard disks, optical disks, large capacity flash memories or other non-volatile memory technologies, and magnetic memories.

The CPU 702 may cause the configuration of the memory 706 to be altered by signals in storage devices 710. In other words, the CPU 702 may cause data and instructions to be read from storage devices 710 in the memory 706 from which may then influence the operations of CPU 702 as instructions and data signals, and from which it may also be provided to the output devices 708. The CPU 702 may alter the content of the memory 706 by signaling to a machine interface of memory 706 to alter the internal configuration, and then converted signals to the storage devices 710 to alter its material internal configuration. In other words, data and instructions may be backed up from memory 706, which is often volatile, to storage devices 710, which are often non-volatile.

Output devices 708 are transducers which convert signals received from the memory 706 into physical phenomenon such as vibrations in the air, or patterns of light on a machine display, or vibrations (i.e., haptic devices) or patterns of ink or other materials (i.e., printers and 3-D printers).

The network interface 712 receives signals from the memory 706 and converts them into electrical, optical, or wireless signals to other machines, typically via a machine network. The network interface 712 also receives signals from the machine network and converts them into electrical, optical, or wireless signals to the memory 706.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. "Logic" refers to machine memory circuits, non transitory machine readable media, and/or circuitry which by way of its material and/or material-energy configuration comprises control and/ or procedural signals, and/or settings and values (such as resistance, impedance, capacitance, inductance, current/ voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation. Those having skill in the art will appreciate that there are various logic implementations by which processes and/ or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory. In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment). Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A drowning alert method comprising:
   monitoring a three-dimensional space, the monitoring performed by one or more monitoring devices;
   identifying, by an identifying component, one or more objects within the three-dimensional space based on received signals from the one or more monitoring devices;
   identifying, by an identifying component, one or more movements of the one or more objects within the three-dimensional space based on the received signals from the one or more monitoring devices;
   receiving, by a receiving component, an alert characteristic control from an alert characteristic control memory structure, the alert characteristic control comprising one or more alert characteristics;
   sending, by the receiving component, an alarm control to one or more machines in response to a machine state for the one or more objects, the alarm control comprising instructions to alter an operation of the one or more machines, the machine state for the one or more objects is set on condition that the one or more movements comprise one or more of the one or more alert characteristics; and
   wherein the three-dimensional space comprises a swimming pool, the one or more objects comprise a small-statured human, and the alarm control is generated in response to the combination of the small-statured human being specifically not located within the swimming pool and additionally the one or more of the objects within the three-dimensional space is specifically not a large-statured human, and the one or more machines comprise a safety net-deploying device, the safety net-deploying device deploying a safety net in response to receiving the alarm control;
   receiving, by the receiving component, an expected response time period control from an expected response time period control memory structure, the expected response time period control comprising an expected response time period;
   receiving, by the receiving component, a time period control from a time period control memory structure, the time period control comprising a measurement of time, the measurement of time being the time from the alarm control being sent to the time period control being sent;
   receiving, by the machine state, a confirmation control from the one or more machines via the receiving component;
   transitioning the machine state to a discontinued state for each of the one or more objects that have the machine state, the discontinued state comprising the measurement of time being less than the expected response time period and receiving the confirmation control from one of the one or more machines; and
   sending, by a sending component, a de-activation control to the one or more machines in response to the discontinued state of the machine state, the de-activation control comprising instructions to de-activate the one or more machines.

2. The drowning alert method of claim 1 further comprising:
   receiving, by the receiving component, the expected response time period control from the expected response time period control memory structure, the expected response time period control comprising the expected response time period;
   receiving, by the receiving component, the time period control from the time period control memory structure, the time period control comprising the measurement of time, the measurement of time being the time from the alarm control being sent to the time period control being sent;
   transitioning the machine state to a notification state for each of the one or more objects that have the machine state, the notification state comprising the measurement of time being greater than or equal to the expected response time period; and
   sending, by the sending component, a notification control to one or more notification-receiving machines in response to the notification state of the machine state, the notification control comprising instructions to activate the one or more notification-receiving machines.

3. The drowning alert method of claim 1, wherein the one or more alert characteristics comprise an instinctive drowning response, the one or more movements comprise the instinctive drowning response, and the one or more machines further comprise a visual-signaling device, the visual-signaling device producing a visual signal in response to receiving the alarm control.

4. The drowning alert method of claim 1, wherein the one or more alert characteristics comprise an instinctive drowning response, the one or more movements comprise the instinctive drowning response, and the one or more machines further comprise an auditory signaling device, the auditory signaling device producing an audible signal in response to receiving the alarm control.

5. The drowning alert method of claim 1, wherein the one or more alert characteristics comprise an instinctive drowning response, the one or more movements comprise the instinctive drowning response, and the one or more machines further comprises a life preserver-deploying device, the life preserver-deploying device deploying a life preserver in response to receiving the alarm control.

6. The drowning alert method of claim 1, wherein the one or more objects comprise the small-statured human, the small-statured human comprising a mouth, one or more arms, and one or more legs, and the one or more alert characteristics comprise an instinctive drowning response, the instinctive drowning response comprising:
   no audible noise from the small-statured human;
   the mouth rising above and sinking below a surface of the swimming pool;
   the one or more arms pressing against the surface of the swimming pool;
   the one or more legs not engaged in a kicking motion; and
   no other movements by the small-statured human.

7. The drowning alert method of claim 1, wherein the one or more monitoring devices further comprise one or more filtering devices.

8. The drowning alert method of claim 1 further comprising performing a system calibration, the system calibration comprising:
   receiving, by the receiving component, a reference object control from a reference object memory structure, the reference object control comprising a system identification of a reference object;
   placing the reference object within the three-dimensional space;
   identifying, by the identifying component, the reference object as a current system identification of the reference object;
   comparing, by a comparing component, the system identification of the reference object to the current system identification of the reference object; and
   sending, by the sending component, a calibration error control to the one or more machines in response to the machine state for the reference object, the calibration error control comprising instructions to alter the operation of the one or more machines, the machine state for the reference object is set on condition that the current system identification of the reference object is not approximately the system identification of the reference object.

9. A computing apparatus, the computing apparatus comprising: a processor; and
   a memory storing instructions that, when executed by the processor, configure the apparatus to:
   monitor a three-dimensional space, the monitoring performed by one or more monitoring devices;
   identify one or more objects within the three-dimensional space based on received signals from the one or more monitoring devices;
   identify one or more movements of the one or more objects within the three-dimensional space based on the received signals from the one or more monitoring devices;
   receive an alert characteristic control from an alert characteristic control memory structure, the alert characteristic control comprising one or more alert characteristics;
   send an alarm control to one or more machines in response to a machine state for the one or more objects, the alarm control comprising instructions to alter an operation of the one or more machines, the machine state for the one or more objects is set on condition that the one or more movements comprise one or more of the one or more alert characteristics; and
   wherein the three-dimensional space comprises a swimming pool, the one or more objects comprise a small-statured human, and the alarm control is generated in response to the combination of the small-statured human being specifically not located within the swimming pool and additionally the one or more of the objects within the three-dimensional space is specifically not a large-statured human, and the one or more machines comprise a safety net-deploying device, the safety net-deploying device deploying a safety net in response to receiving the alarm control;
   receive an expected response time period control from an expected response time period control memory structure, the expected response time period control comprising an expected response time period;
   receive a time period control from a time period control memory structure, the time period control comprising a measurement of time, the measurement of time being the time from the alarm control being sent to the time period control being sent;
   receive a confirmation control from the one or more machines;
   transitioning the machine state to a discontinued state for each of the one or more objects that have the machine state, the discontinued state comprising the measurement of time being less than the expected response time period and receive the confirmation control from one of the one or more machines; and
   send a de-activation control to the one or more machines in response to the discontinued state of the machine state, the de-activation control comprising instructions to deactivate the one or more machines.

10. The computing apparatus of claim 9 wherein the instructions further configure the apparatus to:
   receive the expected response time period control from the expected response time period control memory structure, the expected response time period control comprising the expected response time period;
   receive the time period control from the time period control memory structure, the time period control comprising the measurement of time, the measurement of time being the time from the alarm control being sent to the time period control being sent;
   transitioning the machine state to a notification state for each of the one or more objects that have the machine state, the notification state comprising the measurement of time being greater than or equal to the expected response time period; and
   send a notification control to one or more notification-receiving machines in response to the notification state of the machine state, the notification control comprising instructions to activate the one or more notification-receiving machines.

11. The computing apparatus of claim 9, wherein the one or more alert characteristics comprise an instinctive drowning response, the one or more movements comprise the instinctive drowning response, and the one or more machines further comprise a visual-signaling device, the visual-signaling device producing a visual signal in response to receiving the alarm control.

12. The computing apparatus of claim 9, wherein the one or more alert characteristics comprise an instinctive drowning response, the one or more movements comprise the instinctive drowning response, and the one or more machines further comprise an auditory signaling device, the auditory signaling device producing an audible signal in response to receiving the alarm control.

13. The computing apparatus of claim 9, wherein the one or more alert characteristics comprise an instinctive drowning response, the one or more movements comprise the instinctive drowning response, and the one or more machines further comprises a life preserver-deploying device, the life preserver-deploying device deploying a life preserver in response to receiving the alarm control.

14. The computing apparatus of claim 9, wherein the one or more objects comprise the small-statured human, the small-statured human comprising a mouth, one or more arms, and one or more legs, and the one or more alert characteristics comprise an instinctive drowning response, the instinctive drowning response comprising:
   no audible noise from the small-statured human;
   the mouth rising above and sinking below a surface of the swimming pool; the one or more arms pressing against the surface of the swimming pool; the one or more legs not engaged in a kicking motion; and no other movements by the small-statured human.

15. The computing apparatus of claim 9, wherein the one or more monitoring devices further comprise one or more filtering devices.

16. The computing apparatus of claim 9 wherein the instructions further configure the apparatus to perform a system calibration, the system calibration comprising:
   receive a reference object control from a reference object memory structure, the reference object control comprising a system identification of a reference object;
   place the reference object within the three-dimensional space;
   identify the reference object as a current system identification of the reference object;
   compare the system identification of the reference object to the current system identification of the reference object; and
   send a calibration error control to the one or more machines in response to the machine state for the reference object, the calibration error control comprising instructions to alter the operation of the one or more machines, the machine state for the reference object is set on condition that the current system identification of the reference object is not approximately the system identification of the reference object.

* * * * *